United States Patent
Fukutomi et al.

[11] Patent Number: 5,260,804
[45] Date of Patent: Nov. 9, 1993

[54] IMAGE PROCESSING APPARATUS HAVING FRAME ERASURE CAPABILITY

[75] Inventors: Mitsuo Fukutomi, Tokyo; Katuyuki Kouno, Kanagawa, both of Japan

[73] Assignee: Fuji Xerox Co., Ltd., Tokyo, Japan

[21] Appl. No.: 944,177

[22] Filed: Sep. 11, 1992

[30] Foreign Application Priority Data

Sep. 13, 1991 [JP] Japan .................. 3-234922

[51] Int. Cl.⁵ .................. H04N 1/21; H04N 1/393
[52] U.S. Cl. .................. 358/444; 358/451; 358/453; 358/488
[58] Field of Search ........... 358/451, 453, 452, 406, 358/300, 296, 444, 404, 408, 401, 448, 449, 488

[56] References Cited

U.S. PATENT DOCUMENTS 4,435,723 3/1984 Seimiya et al. .................. 358/300
4,837,635 6/1989 Santos .................. 358/453

FOREIGN PATENT DOCUMENTS 2-70173 3/1990 Japan .
2-131662 5/1990 Japan .
2-161872 6/1990 Japan .

*Primary Examiner*—Edward L. Coles, Sr.
*Assistant Examiner*—Scott A. Rogers
*Attorney, Agent, or Firm*—Finnegan, Henderson, Farabow, Garrett & Dunner

[57] ABSTRACT

An image processing apparatus has an original read unit for reading an image on an original document by a prescan and a copy scan, an image data processing unit for converting original image signals into digital image data signals and for processing the digital image data signals, and an output unit for outputting processed image data. The image processing apparatus further comprises an original detecting unit (3) for reading coordinates data on the original in a prescan mode, and enlargement/reduction processing units (2, 4 to 9) which store the image data read in a copy scan mode into a memory, execute the enlargement/reduction in accordance with the stored image data, whereby the enlargement/reduction processing units (2, 4 to 9) carry out the frame-erasure process by using the original coordinates data. Thereby, an image processing apparatus in which an area to be erased can be flexibly changed, and undesired spaces, which otherwise will be caused by the frame erasure processing, are not created even in a repeat processing or an enlargement/repeat processing.

2 Claims, 10 Drawing Sheets

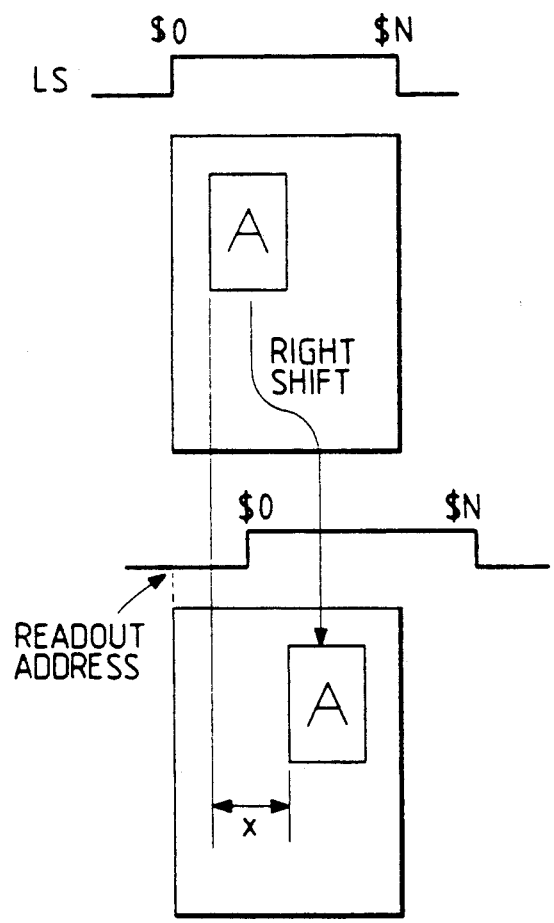
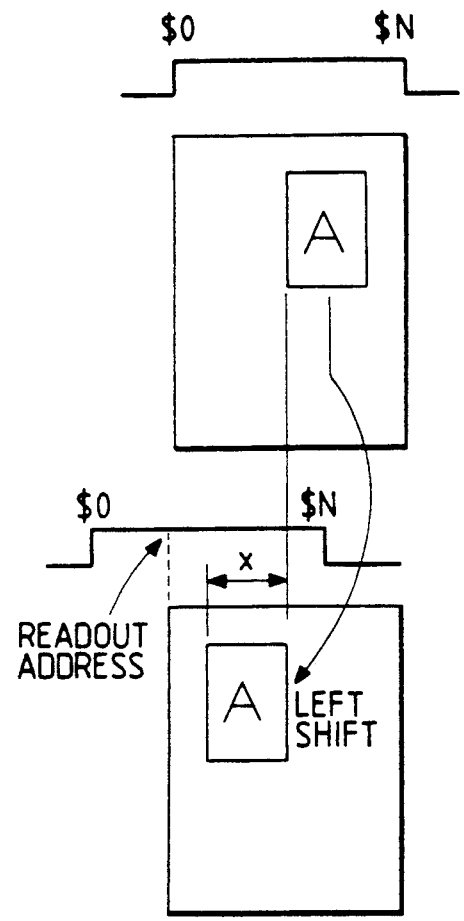
FIG. 2A
FIG. 2B
x: SHIFT QUANTITY (mm)
x: SHIFT QUANTITY (mm)

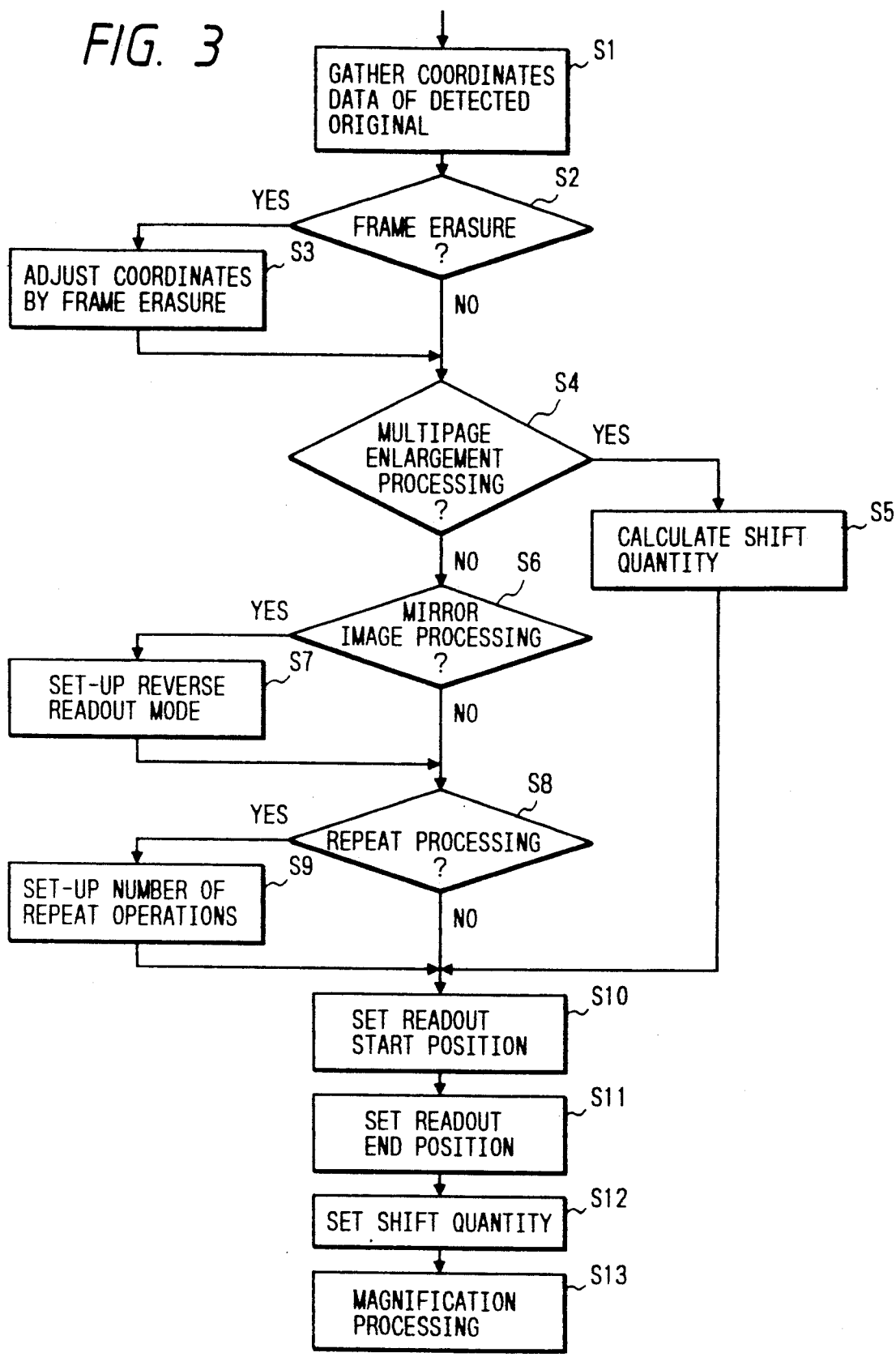

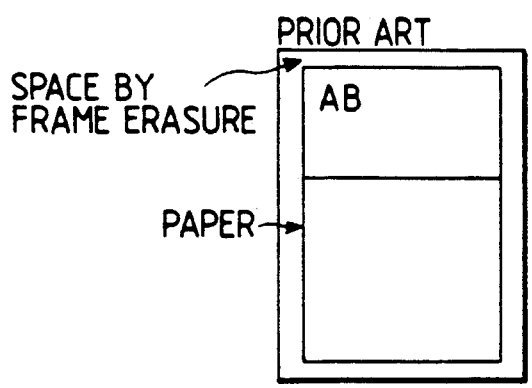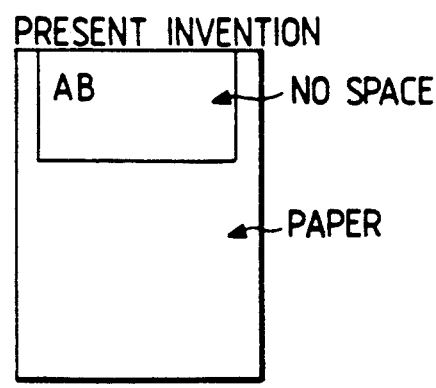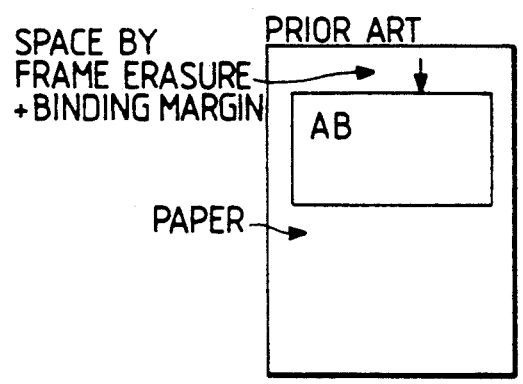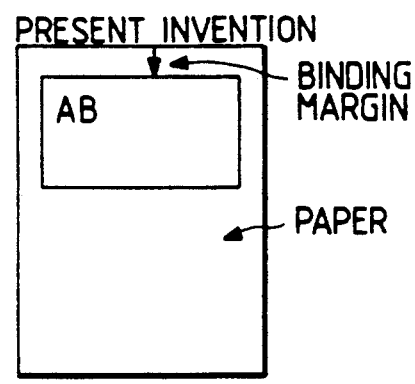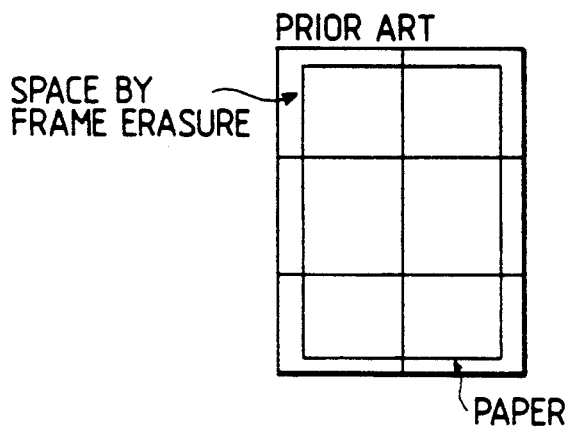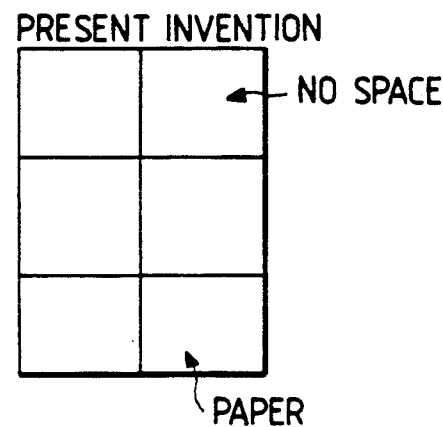

SPACE BY FRAME ERASURE

PRESENT INVENTION

NO SPACE

IMAGE PROCESSING APPARATUS HAVING FRAME ERASURE CAPABILITY

BACKGROUND OF THE INVENTION

The present invention relates to an image processing apparatus having an original read unit for reading an image on an original document by a prescan and a copy scan, an image data processing unit for converting original image signals into digital image data signals and then for processing the digital image data signals, and an output unit for outputting processed image data signals.

A digital copying machine converts analog image signals, which are gathered by reading an image on an original document, into digital multi-valued data, and processes the multi-valued data for image quality adjustments, such as granularity, gradation, and definition, thereby reproducing the original image in the form of a mesh-dot image. In a full color digital copying machine, an image on the original is optically read and separated into three color signals B (blue), G (green), and R (red). The color signals B, G and R are color-corrected into recording signals Y (yellow), M (magenta), and C (cyan) of coloring materials, such as toner, ink, ink donor film, or the like. Mesh-dot images of the respective coloring materials are superposed to reproduce a full color original image. Actually, the coloring materials of equal quantities are removed for saving the coloring materials (this process is called an under color removal (UCR)), since the coloring materials of equal quantities make up a nonchromatic image. The color image after undergoing the UCR is reduced in the quantities of coloring materials used. Accordingly, it gives an expression lack of deepness and accordingly is poor in voluminousness on the whole. Since the reproduction of gray and black is contradictive to the reproduction of color of high chroma, simple UCR processing will insufficiently improve the color reproduction performance. For improving the color image of poor voluminousness or for a gray component output, black (K) is generated of which the quantity corresponds to the quantities of coloring materials removed by the UCR process.

As described above, the analog signal is converted into a digital multi-valued data signal, and the digital data signal is used for various processings. The image data signal, taking the digital form, is convenient in executing various types of processings. The digital image data signal is temporarily stored into a memory, and it is read out of the memory when required, for example, when various types of edits are executed, such as data conversion, correction, adjustment, and others. Accordingly, the machine may have many additional functions. To operate the machine, an original document is set and a start button is pushed. Then, the machine prescans the original, and automatically detects the size of the original, and selects a paper of the detected size. Where a magnification percentage is designated, the machine multiplies the detected size by the designated magnification, and selects a paper of the calculated size and copies the image on the paper. To detect the size of the original, the edges of the original must be distinguished from the read image data. To this end, the platen is designed to have the reflectivity different from that of white or to have color, not white. For this reason, the peripheral portion of the paper extended beyond the original, when copied, has an optical density or the color of the platen. By utilizing this feature of the original size detection, the image signals representing the peripheral portion of paper, or the platen, are converted into color signals of white as the texture color of the original.

For a better understanding of the digital color copying machine as mentioned above, the digital color image forming apparatus proposed by Unexamined Japanese Patent Publication (Kokai) Hei-2-70173 and Hei-2-131662 will be described briefly.

FIG. 7 is a block diagram showing the arrangement of the digital color image forming apparatus.

In FIG. 7, an IIT (image input terminal) 100 reads an image on an original by using a CCD sensor, and converts color separated image signals B, G and R into digital image data. An IOT (image output terminal) 115 reproduces a color image through the laser-beam based exposure and developing processes. The blocks ranging from an END conversion module 101 to an IOT interface 110, which are located between the IIT 100 and the IOT 115, make up an image processing system (IPS). In the IPS, the read signals B, G and R are converted into toner recording signals Y, M and C, and additionally K. Every developing cycle, the recording signal corresponding to the developing color is selected and output. In converting the read signals (B, G and R signals) into the recording signals (Y, M, C, and K signals), how to adjust color balance, how to reproduce the colors in accordance with the read characteristic of the IIT and the output characteristic of the IOT, how to adjust the balance of the density and contrast, how to adjust the edge emphasis, blur and Moire, and the like become problematic.

In the IIT 100, the read signals B, G and R are gathered, by a CCD sensor, at density of 16 dots/mm for one pixel, and are output as data of 24 bits (3 colors×8 bits; 256 gradations). The CCD sensor of 300 mm long and at the density of 16 dots/mm has B, G and R filters mounted thereon. It is capable of making the scan of 16 lines/mm at the process speed of 190.5 mm/sec. Accordingly, it outputs a read signal of each color at the rate of approximately 15M pixels per second. The IIT 100 logarithmically converts the B, G and R analog signals of pixels, so that the reflectivity data is converted into density data, and further converts the analog signals into digital signals.

The IPS receives the read signals B, G and R, processes the image data signals for improving the reproduction quality of colors, gradation, definition, and the like, selects recording signals of the developing process colors from the recording signals Y, M, C, and K, converts the signals into on/off signals, and outputs them to the IOT 115. The IPS, as shown in FIG. 7, is comprised of an END (equivalent neutral density) conversion module 101 for adjusting (converting) the image signals into gray-balanced color signals, a color masking module 102 for converting the read signals B, G and R into recording signals corresponding to the quantities of toners Y, M, and C by matrix operating the read signals, a document size detecting module 103 for detecting the document size in a prescan mode and for erasing (frame-erasing) the platen color in a read scan mode, a color change module 104 for changing the color, which is designated in a specific area, according to an area signal input from an area image control module, an UCR & black generating module 105 which generates a proper quantity of black K and removes the equal quantities of the colors Y, M, and C according to the quantity of generated black so as not to cause color impurity, and gates the signals after the K signal and the Y, M, and C signals are subjected to the under color removal process according to the signals of a monocolor mode and a 4-full color mode, a spatial filter 106 having the functions for blur removal and for Moire removal, a TRC (tone reproduction control) module 107 having various functions for reproduction quality improvement, such as density adjustment, contrast adjustment, negative/positive inversion, and color balance adjustment, an enlargement/reduction processing module 108 for enlarging and reducing the image size in the fast scan direction, a screen generator 109 for converting tone toner signals of process colors into on/off or binary-coded toner signals, an IOT interface module 110, an area image control module 111 including an area generator circuit and a switch matrix, and an edit control module including an area command memory 112, a color palette video switch circuit 113, a font buffer 114, and the like.

In the digital color image forming apparatus described above, the original frame-erasure processing is performed in the document size detecting module 103 The outline of it will be given hereunder (see Unexamined Japanese Patent Publication (Kokai) Hei-2-131662).

The original frame-erasure is the processing to erase the frame of an original document, viz., to convert the signals indicative of the platen cover into white signals. In the frame erasure processing, during a copy cycle of each developing color, the machine clears the read data of the platen cover portion into the white signal, while recognizing colors. At the same time, the machine allows the image data of the original document to be output as intact. Accordingly, the frame erasure processing requires a color detection. Where attempt is made to erase the frame of the original by using the output signal of a spatial filter selected by the developing color, one encounters such a problem that the edge of the original cannot be detected. It is for this reason that the image data before the developing color being selected and the processings of the color change, UCR and the like being carried out is used for the frame erasure processing. Specifically, when the input image data of Y, M, and C are below the threshold value, it is decided that the image data is that of the original document, and the leading and trailing edges of the data signals are detected. At the n-th line, the count at that time is latched by using the leading and trailing edge signals, is operated, and the operated values are used as the values indicative of the area within the original. At the subsequent (n+1)th line, the image area signal is generated using the operated values. On the basis of the original area signal, the signals indicative of the area outside the original are converted to white data signals.

In erasing the frame by using the original size detecting module, erasure is made of only the shade of the platen back outside the original. In the case of the repeat processing, for example, the harmful influence by the frame erasure becomes actual. Furthermore, inputs and outputs are required for Yellow, Magenta, and Cyan of coloring material, respectively. Therefore, the processing circuit becomes a large scale, and a number of input/output signals becomes a large number.

FIG. 8 shows explanatory diagrams for explaining the harmful influence caused by the conventional frame-erasure processing. In the conventional frame-erasure processing using the original size detecting module, when the copy is carried out in a repeat mode, spaces caused by the frame erasure process appear, every time the image is repeated, in a series of images, as shown in FIG. 8A. In other words, it is impossible to form a series of repeated images continuously arranged as shown in FIG. 8B. In the conventional frame erasure technique, after the edge of the original is detected, a fixed area extended outside the detected edge of the original is erased. In other words, the erased area cannot flexibly be changed as desired. Accordingly, in a rectangular shape as shown in FIG. 8D, the frame erasure is impossible. The resultant image is as shown in FIG. 8C.

SUMMARY OF THE INVENTION

Accordingly, an object of the present invention is to provide an image processing apparatus in which an area to be erased Can be flexibly changed, and undesired spaces, which otherwise will be caused by the frame erasure processing, are not created even in a repeat processing or a multi-page enlargement processing.

To achieve the above object, there is provided an image processing apparatus having an original read unit for reading an image on an original document by a prescan and a copy scan, an image data processing unit for converting original image signals into digital image data signals and for processing the digital image data signals, and an output unit for outputting processed image data signals, the image processing apparatus further comprises: an original detecting unit for detecting coordinates data on the original in a prescan mode; and an enlargement/reduction processing unit which stores the image data read in a copy scan mode into a memory, and executes an enlargement/reduction in accordance with the stored image data, whereby the enlargement/reduction processing unit carries out the frame-erasure process by using the original coordinate data.

With such an arrangement of the image processing apparatus, in a prescan mode, the coordinates data of an original document is read by the original detecting unit, whereas in a copy scan mode, the frame erasure processing is performed by the enlargement/reduction processing unit. In the processings of enlargement/reduction, movement, repeat, mirror image, multi-page enlargement, and the like, the frame erasure can also be carried out by controlling the readout address. Accordingly, the problem of an excessive frame erasure can be solved. The area to be erased can be flexibly set as desired. Furthermore, inputs and outputs for Yellow, Magenta, and Cyan of coloring material are made unnecessary. Consequently, the processing circuit can be simplified, and number of input/output signals can be reduced.

BRIEF DESCRIPTION OF THE DRAWINGS

FIGS. 2A to 2E are explanatory diagrams for explaining the processings of movement, mirror image, and repeat;

FIG. 3 is a flowchart showing a control flow by an enlargement/reduction module controller;

FIGS. 6A to 6F are explanatory diagrams comparatively showing some types of processings by the conventional technique and the invention in order to show the effects of the invention;

DESCRIPTION OF THE PREFERRED EMBODIMENT OF THE INVENTION

Figure 1:
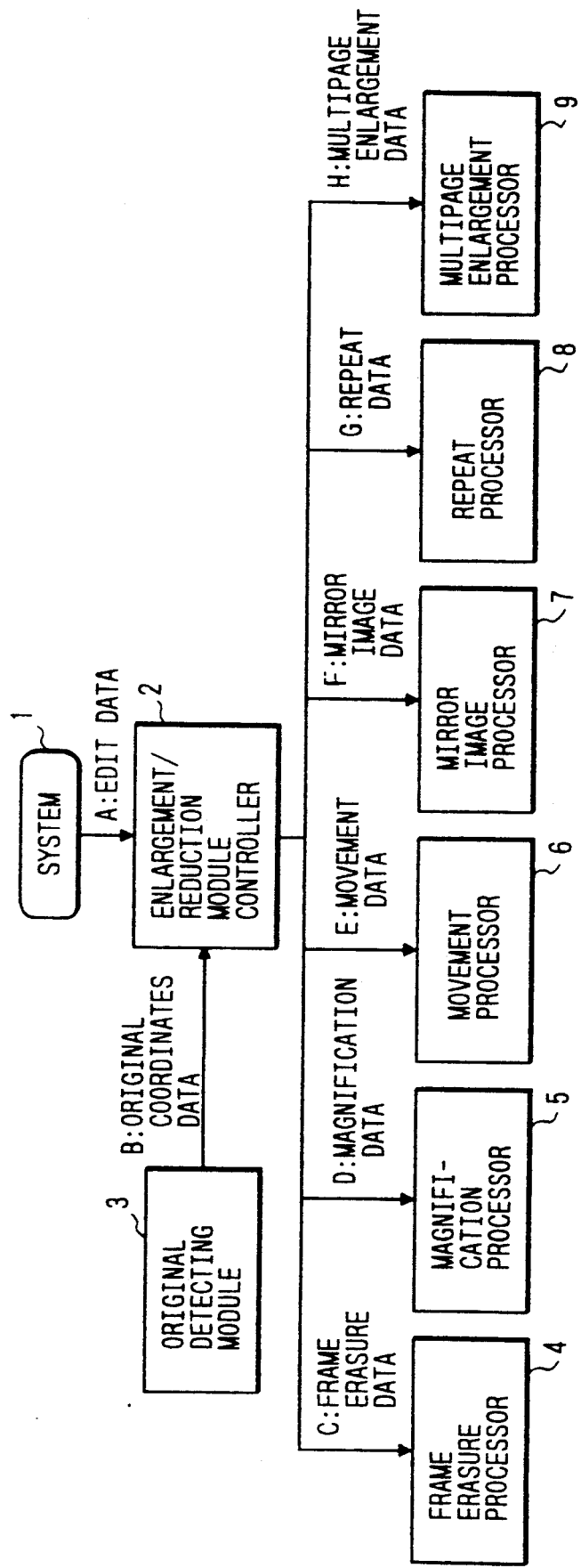
FIG. 1 is a block diagram showing an embodiment of an image processing apparatus according to the present invention.

The preferred embodiment of the present invention will be described with reference to the accompanying drawings. FIG. 1 is a block diagram showing an embodiment of an image processing apparatus according to the present invention.

In FIG. 1, a system 1, which operates in response to an instruction by a user to control, is provided for an overall control for the copy output, which includes the controls for the original read operation, edits of image data, and the like. An original detect module 3 detects the size of an original document in a prescan mode, thereby to gain the coordinates data B of the original. An enlargement/reduction module controller 2 controls the respective processors (4 to 9) of the enlargement/reduction module when, in a copy scan mode, receiving the original coordinates data B from the original detect module 3 and the edit data A from the system 1. The edit data transferred from the system 1 to the enlargement/reduction module controller 2 includes frame erasure data C, magnification data D, movement data E, mirror image data F, repeat data G, and multi-page enlargement data H. According to these items of edit data and the coordinates data, a frame erasure processor 4, magnification processor 5, movement processor 6, mirror image processor 7, repeat processor 8, and an multi-page enlargement processor 9 are selectively controlled for their processings.

Figure 2C:
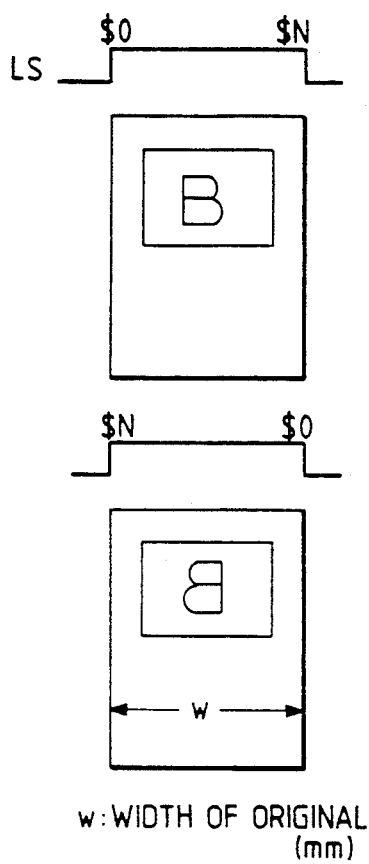
Figure 2D:
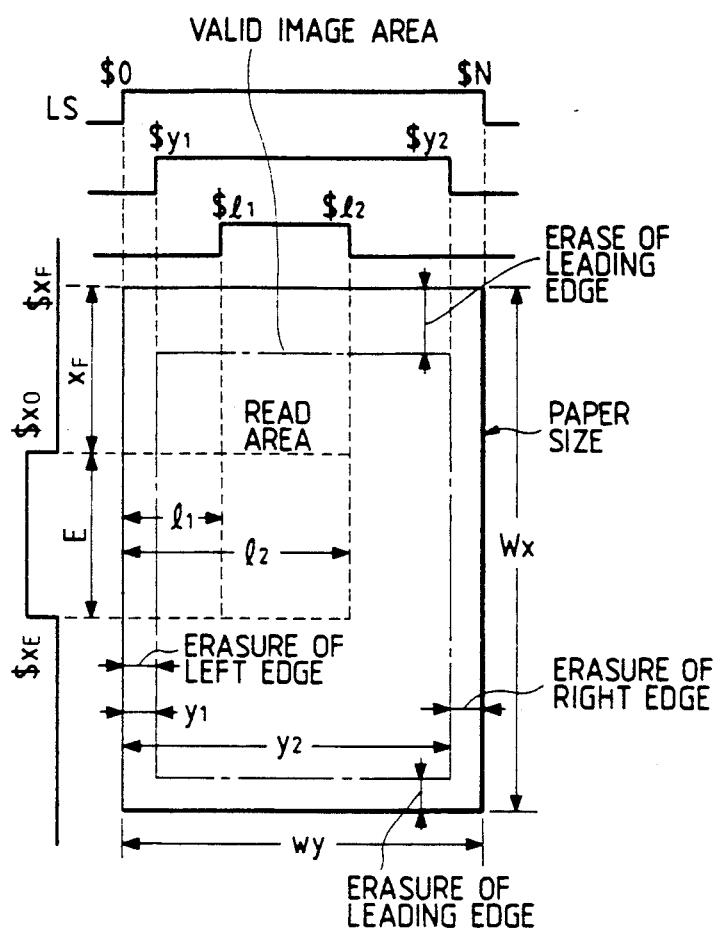
Figure 2E:
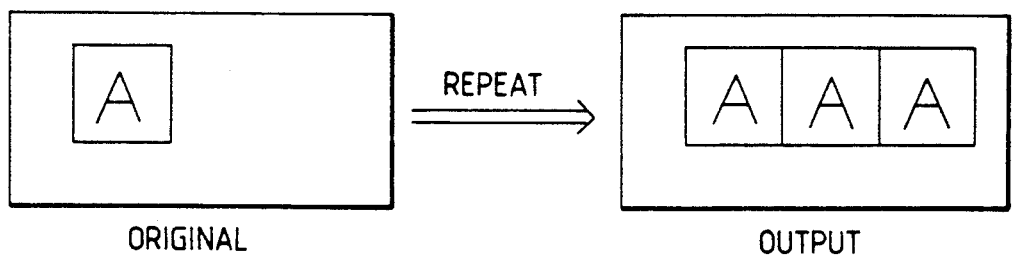

FIG. 2 shows explanatory diagrams for explaining the processings of movement, mirror image, and repeat. In a case where an image is shifted to the right by a distance of x (mm), the image data is read out after the address corresponding to a shift quantity as shown in FIG. 2A. In connection with the number of addresses corresponding to the shift quantity, the shift quantity x (mm) corresponding to the resolution of 16 dots/mm, for example, when it is multiplied by 16, is converted into a value expressed in terms of the number of dots. In a case where the image is shifted to the left as shown in FIG. 2B, the readout operation starts from the sum of that number of addresses and the first write address.

In the case of the image processing as shown in FIG. 2C, the data that has been stored into successive memory locations from address O to N is read out in the reverse order, namely, from address N to O. The value obtained by converting the width w of an original document into the number of dots is used for the set value.

In a case where the shift and mirror image processings are not carried out, the image data is read out in the order from address O to N. To be more specific, in an area as shown in FIG. 2D, the image data is read out in the range from $y1 to $y2 for the 100% magnification. When the edit is the image processing and no readout area is designated, the image data is read out in the reverse order, i.e., from address $y2 to $y1. When the readout area is designated, it is read out in the range from $l2 to $l1. For the processings of the enlargement/reduction (magnification), movement and repeat, the image data is read out in the range between and the order from address $l1 to $l2. The frame erasure is realized in a manner that the readout operation is applied for the area that is reduced by the frame area. This is equivalent to the case where the readout area is designated. In the multi-page enlargement processing, the memory area is divided into segmental memory areas, image data is read out of the segmental memory area and enlarged, and the readout and enlargement process is repeatedly carried out for each segmental memory area. Accordingly, the multi-page enlargement processing is equivalent to the repeat of the enlargement/reduction processing when the readout area is designated.

The reduction processing in the magnification processor is realized in a manner that necessary data is selected through the two-point interpolation and loaded into a line buffer, and is read out in a normal way. The enlargement processing is realized in a manner that image data is loaded in a normal way, and when the image data is read out, necessary data is added to the image data through the two-point interpolation. Assuming that readout data (pixels 0, 1, 2, 3, . . . ) is present, the magnification is N, and the order of pixels arrayed is m (m=0, 1, 2, 3, . . . ), the position of data to be composed with respect to the readout pixels is given by $m \times (1/N)$. A value of the pixel of the composed data is determined by the values of the pixels on both sides of the pixel of the composed data and the position of the pixel relative to its adjacent pixels according to the algorithm of the two-point interpolation.

The processing technique by the enlargement/reduction module is already proposed by the Unexamined Patent Application Publication Hei-2-161872. This technique is available for the frame erasing of the present invention.

A flowchart of a control flow by the enlargement/reduction module controller 2 is shown in FIG. 3. The enlargement/reduction module controller 2 gathers the coordinates data of a detected original document in a copy scan mode (step S1), and checks whether or not execution of the frame erasure processing is required, on the basis of frame erasure data (step S2). If it is required (the answer is YES), the original coordinates is adjusted by the quantity of the frame erasure.

When the multi-page enlargement processing is executed (step S4), the quantity of shift for each copy is calculated (step S5). When the mirror image processing is executed (step S6), a reverse readout mode is set up (step S7). In the case of the repeat processing (step S8), the number of repeated readout operations is set (step S9).

Thereafter, the readout start position and the readout end position are set, and the quantity of shift is set, thereby to complete the magnification processing.

Figure 4A:
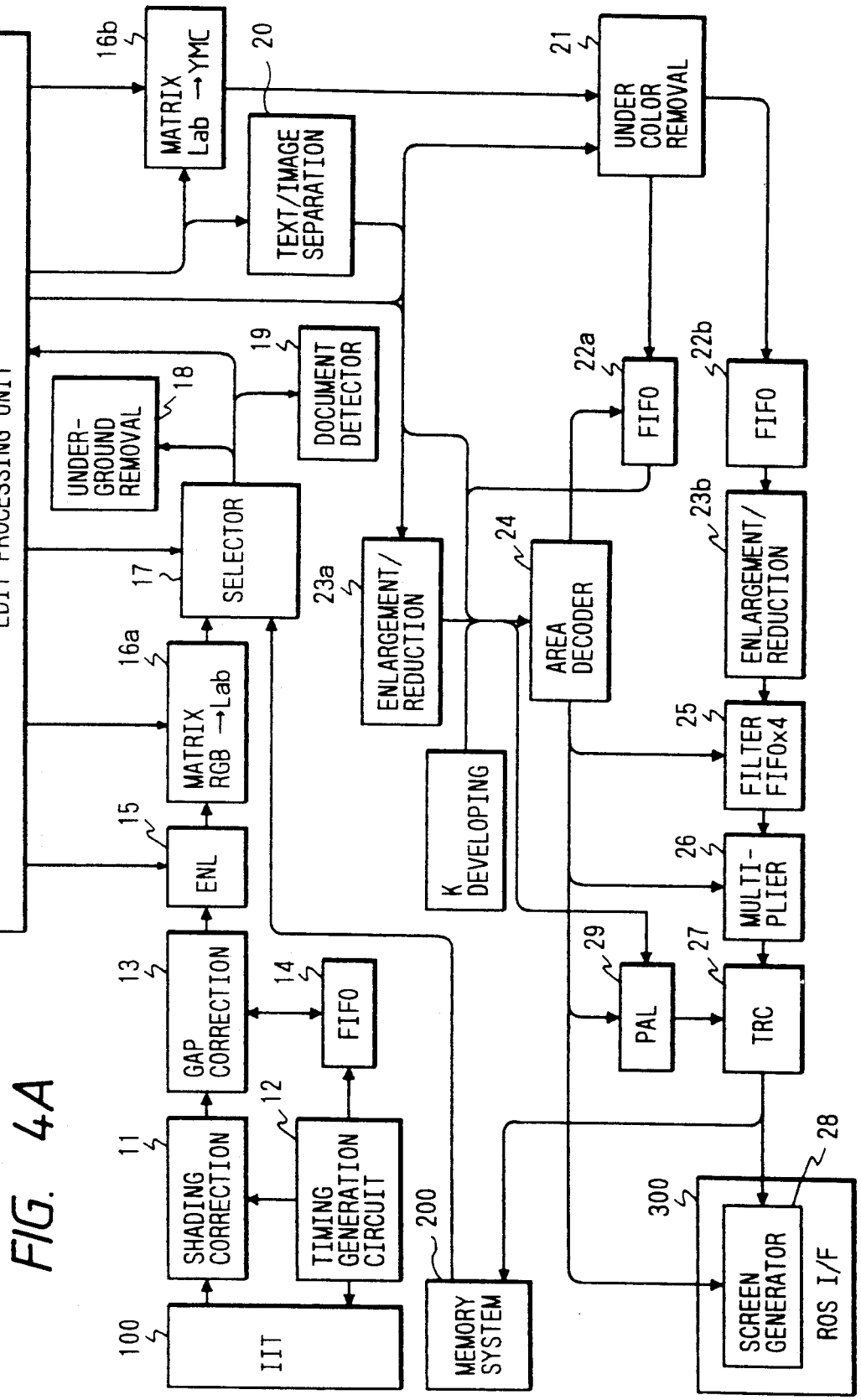
FIGS. 4A and 4B are block diagrams showing the arrangement of a signal processing system in the image processing apparatus.
Figure 4B:
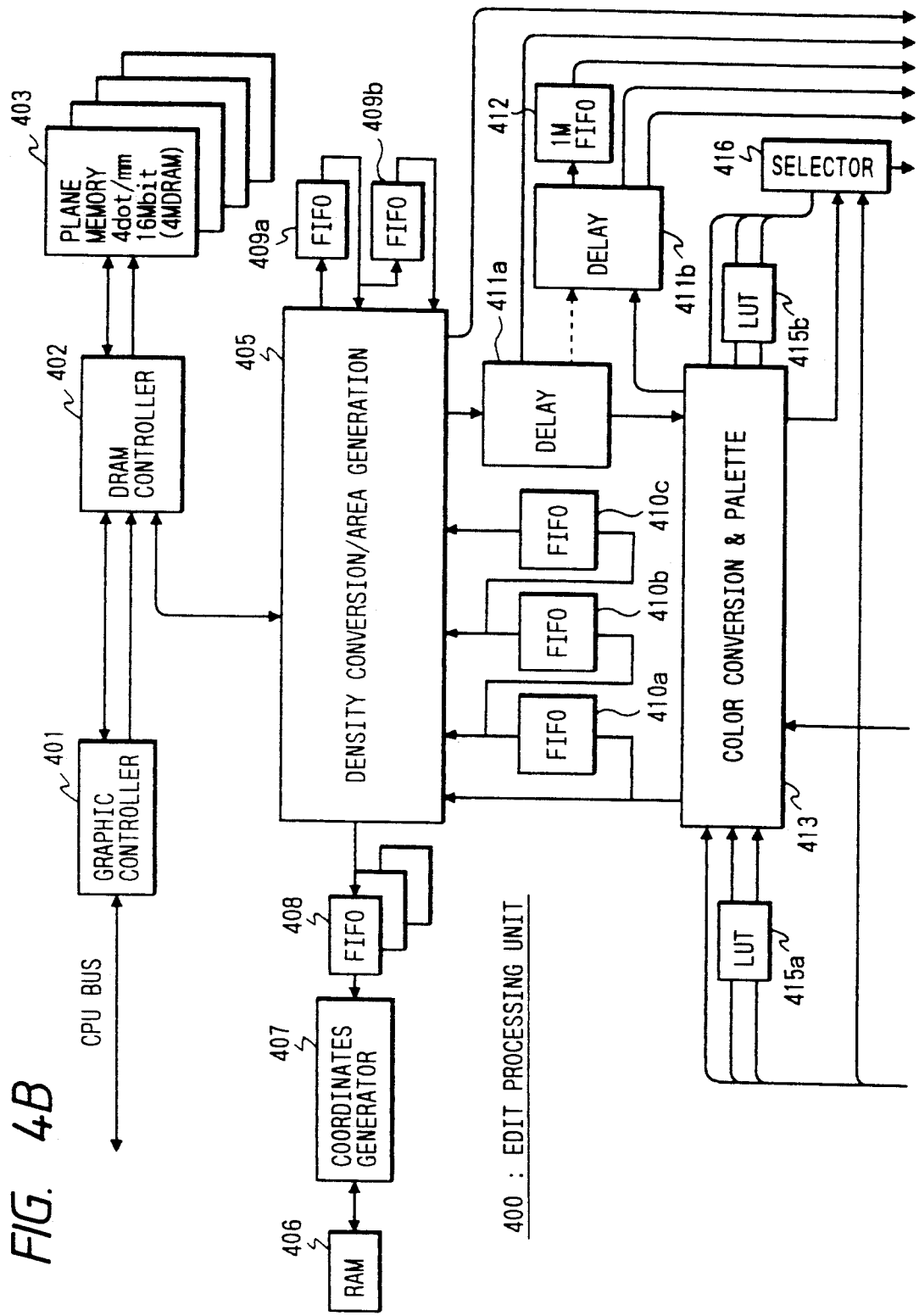
Figure 5:
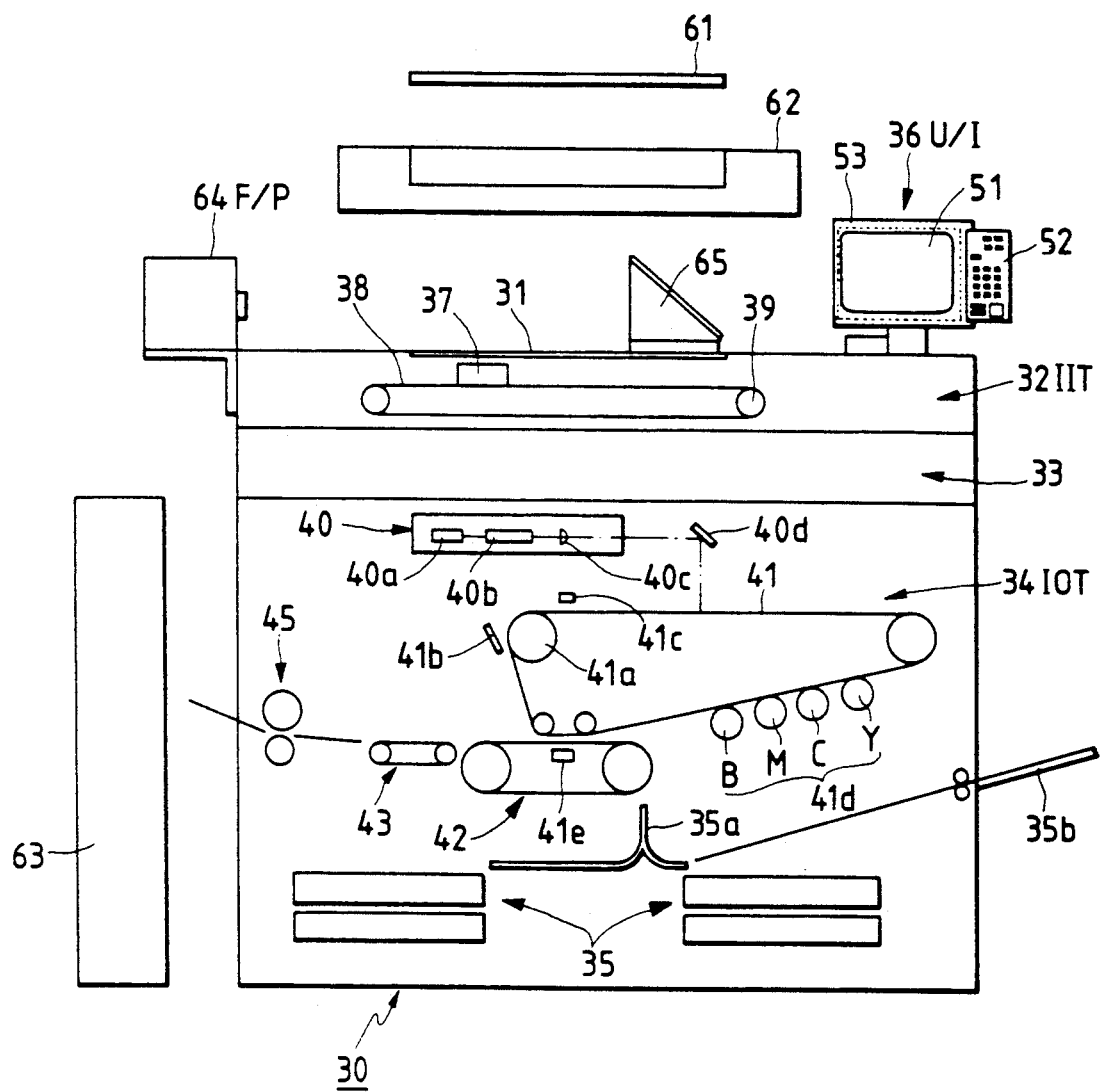
FIG. 5 is side view showing the construction of the image processing apparatus.
Figure 7:
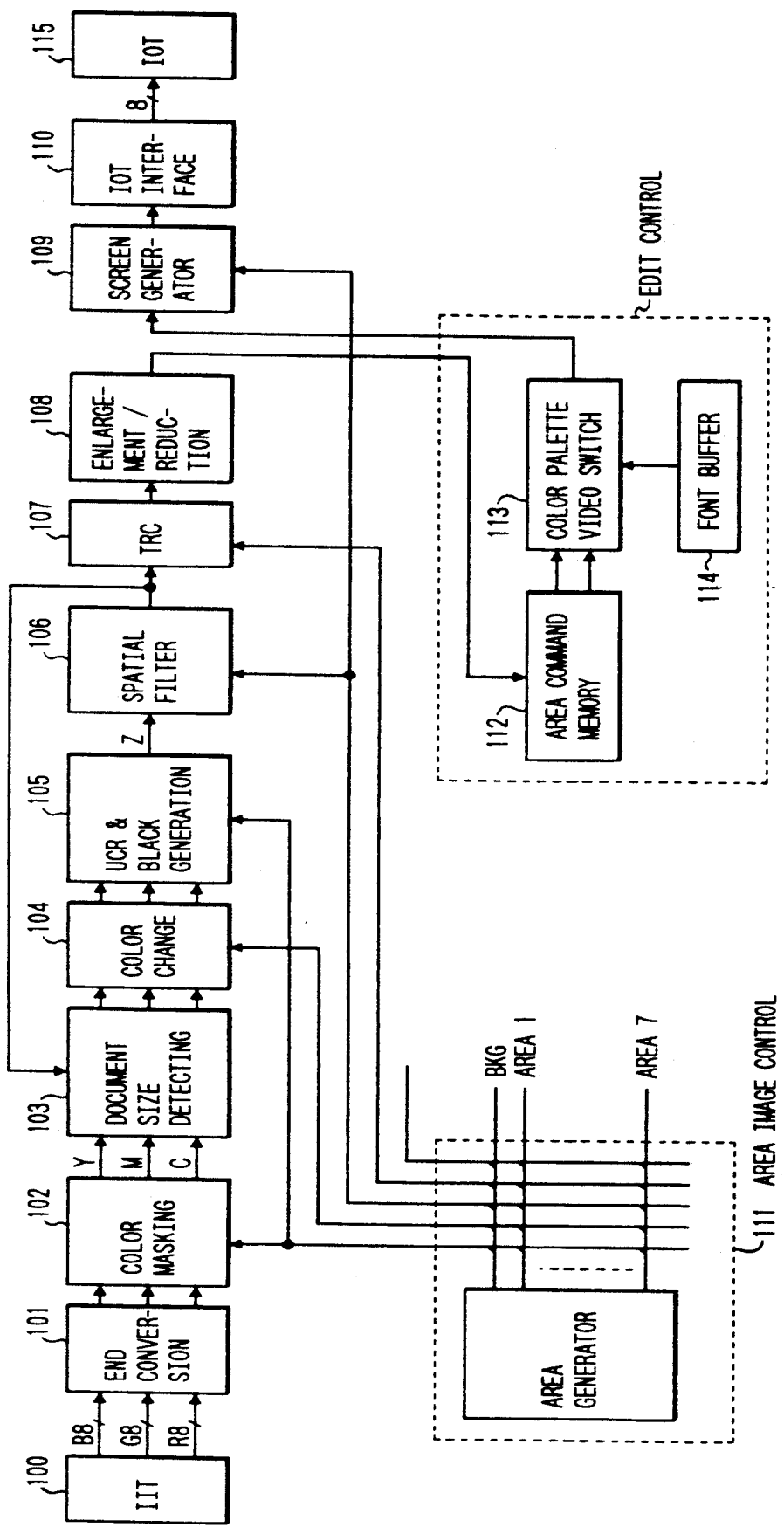
FIG. 7 is a block diagram showing the arrangement of the digital color image forming apparatus.

An image processing apparatus into which the present invention is incorporated will be described with reference to FIGS. 4A, 4B and 5. FIGS. 4A and 4B are block diagrams showing the arrangement of a signal processing system in the image processing apparatus. FIG. 5 is a side view showing the construction of the image processing apparatus.

In FIG. 4A, an image input terminal (IIT) 100 contains a size-reduction type sensor which consists of three line sensors of R, G and B arrayed perpendicular to the vertical scan direction. The IIT 100 scans in the main scan direction in synchronism with a timing signal from a timing generating circuit 12, while moving in the vertical scan direction at the speed based on the magnification of enlargement and reduction. In the IIT, the analog image data is converted into digital image data of 8 bits, for example, which is expressed in gray levels. The image data suffering from the nonuniformity among the pixels owing to various factors is shading-corrected by a shading correction circuit 11, and applied to a gap correction circuit 13 where gaps among the line sensors are corrected. In the gap correction, the read image data is delayed by the quantities corresponding to the gaps by an FIFO 14 so that the R, G, and B image signals corresponding to the same positions appear at the same time. An ENL (equivalent neutral lightness) converting circuit 15 is provided for gray balancing the image data using the parameters based on the document type. The setting of gray levels in the image signal is inverted every pixel, viz., the negative/positive inversion is performed, by a negative/positive inverting signal from an edit processing unit 400 to be given later. The ENL converting circuit 15 may selectively make the negative/positive inversion in only a specific image area.

The R, G and B image signals processed by the ENL converting circuit 15 are converted into image signals L*, a*, and b* in a uniform color space by a matrix circuit 16a. Of these signals L*, a*, and b*, the signal L* indicates a value and the signals a*, and b* indicate a chromaticity plane (hue and chroma) in the coordinates system having three coordinate axes. With the conversion of the image signal from R, G and B to L*, a*, and b*, an easy interface of the system with other devices, such as computers through a memory system 200 is realized and the color change, edit processing and image data detection are easy. A selector 17 selects either the output signal of the matrix circuit 16a or the image data from the memory system 200 as an interface with an external computer, or receives both image data to make the texture composition or the spaced composition. To this end, the selector 17 has the function of setting the composition ratio, and the functions of the operation processing, and the composition processing.

An underground removal circuit 18 detects an underground density by preparing a histogram of densities on the document through a prescan, and removes the pixels having densities lower than the detected underground density, thereby to improve the copy quality of fog-contained documents like newspaper. A document detector 19 detects and stores the size of an original document. To detect the document size, the detector 19 detects the boundary of the reverse side of a black platen, thereby to obtain a rectangle defining the outer peripheral edge of the original. In the underground removal circuit 18 and the document detector 19, the signal L* of those signals L*, a*, and b* is used for representing the value data.

The edit processor 400 performs the edit processing for each area, sets area commands for switching the parameters, and generates area control signals based on the area commands. Further, it performs the processings of the color edit and color change for the image data, the processing of marker color detection, and the like. The image data thus processed is input to a matrix conversion circuit 16a and a text/image separation circuit (TIS circuit) 20.

The L*, a*, and b* image data signals after edit processed are transformed into the toner colors Y, M and C, by the matrix conversion circuit 16a. The text/image separation circuit 20 groups a plurality of pixels into blocks to identify the area of color character, black character or image (character/halftone). The undercolor removal circuit 21 generates black (K) using the image data of Y, M and C output from the matrix conversion circuit 16b according to the signal of monocolor/full color, and subtracts the equal quantities of the Y, M and C image data from the Y, M and C image data, thereby to produce the image data of process colors. Since in identifying the area by the text/image separation circuit 20, since the pixels are grouped into blocks, the area identifying signal is delayed by 12 lines, for example. The FIFOs 22a and 22b are used for synchronizing the hue signal and the image data with the delayed area identifying signal.

An enlargement/reduction circuit 23b executes the frame erasure, magnification, movement, mirror image, repeat and multi-page enlargement processing using the frame erasure, magnification, movement, mirror image, repeat and multi-page enlargement data, and the original coordinates data. The enlargement or reduction of the image data in the vertical or slow scan direction is performed in the IIT (image input terminal) 100, by changing the scanning speed according to the rate of enlargement or reduction. Accordingly, the enlargement/reduction circuit thins out or interpolates the image data in the main scan direction. Another enlargement/reduction circuit 23a is provided for processing area commands for enlargement or reduction so that area control data is applied exactly to the area to which it is to be applied. The area control data after the enlargement or reduction processed is decoded by an area decoder 24, and applied to the decoded data to the respective processing blocks. The area decoder 24 generates, by using the area commands, and area identifying signals, signals for switching the parameters of a filter 25 and a TRC circuit 27, the coefficient of a multiplier 26a, and the like, and distributes the generated signals to the related circuits.

The filter 25 processes the enlarged or reduced image data to remove moire in the halftone image and emphasis edges in the character image according to a spatial frequency. The TRC circuit 27 is used for adjusting the density according to the IOT characteristic by using the conversion table. A PAL 29 is a decoder for switching parameters in the conversion table of the TRC circuit 27 by the developing process and area identifying signals. A multiplier 26 operates the expression of "ax+b" where x is image data, and a and b are coefficients. The coefficients are switched to "through" for the halftone, and "high $\gamma$" for the characters. This is used in combination with the TRC circuit 27, and performs the data reset and adjusts the colors and density of color and black characters, and image patterns by properly selectively using the coefficients for the respective colors and conversion tables. If the parameters of the filter 25 are standardized, it is possible to make the edge emphasis of the characters by using the coefficients a and b. The image data adjusted by those is stored in the memory system or output from a screen generator 28 of a ROS 300 in the form of a dot-mesh image.

The edit processor 400 performs the color change and color edit, and generates area control signals, and receives the image data L*, a*, and b* from the selector 17. In an LUT 415a, the chromaticity data is transformed from the data a and b in the orthogonal coordinates system to the data C and H in the polar coordinates system. This is done for providing easy detection of marker and other colors, and rendering easy the color edit, color change and the like. A color conversion & palette 413 contains colors for color change and color edit in 32 number of palettes, and processes the image data L, C and H for marker color detection, color edit, color change and the like according to area commands supplied through a delay circuit 411a. Only the image data in the area to be color changed is processed by the color conversion & palette 413, and inversely transformed from the data C and H to the data a and b by an LUT 415b. The image data in the other areas than the color-changed area are directly output from a selector 416 and is transferred to the matrix conversion circuit 16b.

The marker colors (three colors) detected from the image data in the color conversion & palette 413 and the 4-bit signal in the closed area are transferred to a density-conversion/area generating circuit 405. In the density conversion/area generating circuit 405, by using FIFOs 410a, 410b and 410c, with a 4×4 window, the image data is binary-coded in such a manner that if black pixels more than a predetermined number are contained in the sixteen (16) pixels, "1" is assigned to the image data. Through the binary-coding processing, the image density is converted from 400 spi to 100 spi. Marker signals (of closed loop and marker dots) thus generated in the density conversion/area generating circuit 405 are stored into a plane memory 403, through a DRAM controller 402.

Not to mistaken dusty particles as the marker, the marker dot signal is delayed by the quantity of three (3) lines by means of a FIFO 408, thereby to form a 3×3 window. In a coordinates generating circuit 407, the marker dots are detected and their coordinate values are generated and stored in a RAM 406. It is to prevent the mistaken detection that the marker dot signals, which are also stored into the plane memory 403, are thus processed.

The plane memory 403 is provided for storing area commands for color change, color edit, and other area edits. Also from the edit pad, the use may specify an area and write the area command into the specified area. The area command of the area specified from the edit pad is transferred through a CPU bus to a graphic controller 401, and then is written into the plane memory 403 through a DRAM controller 402. The plane memory 403 consists of four memory planes and is capable of storing sixteen (16) types of area commands, 0 to 15.

The area commands of 4 bits stored in the plane memory 403 is read out of the memory in synchronism with the outputting operation of the image data. The area command thus read out is used for edit-processing in the color conversion & palette, and for switching the parameters in the filter 25, multiplier 26, TRC circuit 27, screen generator 28, and the like, through the image data processing system, ENL conversion circuit 15, matrix conversion circuit 16, selector 17, undercolor removal circuit 21, and the area decoder 24 (FIG. 4(a)). When the area command is read out of the plane memory 403, and is used for the edit processing in the color change & palette 413 and for switching the parameters in the image processing system, it is required to convert the density from 100 spi to 400 spi. The density conversion is executed by the density conversion/area generating circuit 405. In the circuit 505, pixels are grouped into 3×3 blocks by using FIFOs 409a and 409b, and the data is interpolated according to the pixel block pattern. In this way, the density conversion from 100 spi to 400 spi is performed so as not to zig-zag closed loop curves and the boundaries of edit areas. Delay circuits 411a and 411b, 1MFIFO 412, and the like are provided for the timing adjustment of the area command to the image data.

In the color copying machine shown in FIG. 5, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an edit pad 61, an automatic document feeder (ADF) 62, a sorter 63, and a film image reader having a filter projector (F/P 64 and a mirror unit (M/U) 65.

The IIT 32 includes an imaging unit 37, a wire 38 for driving the imaging unit 37, drive pulleys 39, and the like. In the IIT 32, a color image on a color original document is separated into three primary colors B (blue), G (green), and R (red) by means of filters within the imaging unit 37, and is read by a CCD line sensor. The image data thus obtained is converted into multitone digital image signals B, G and R, and output to an image processing system. The image processing system, contained in the electric-control-board container 33, receives B, G and R image signals, applies various types of conversions and correction processings to those image signals to improve image quality, such as colors, tone and definition, and reproduction performances, and performs additional edit processings of the color image data. Further, the image processing system converts the image colors into the toner primary colors Y (yellow), M (magenta), C (cyan), and K (black), converts toner signals of the process colors into on/off or binary-coded signals, and outputs those converted signals to the image output terminal 34. In the IOT 34 including a scanner 40, and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/θ lens 40c, and a reflection mirror 40d. The thus formed color image is transferred onto a paper supplied from the paper tray 35, and is output in the form of a color copy.

In the IOT 34, the photoreceptor belt 41, driven by a drive pulley 41a, is provided. A cleaner 41b, a charger 41c, Y, M, C and K developing units 41d, and a transfer unit 41e are disposed around the photoreceptor belt 41. A transfer device 42 is further provided in connection with the transfer unit 41e. The transfer device 42 nips a recording paper supplied through a paper transfer path 35a from the paper tray 35, is rotated four times (in the case of 4-color full copy) to transfer Y, M, C and K latent images on the paper. The paper bearing the four latent images is forwarded through a vacuum transfer unit 43 to a fixing unit 45. After the latent images are fused and fixed on the recording paper, the paper is discharged outside. An SSI (single sheet inserter) 35b allows a user to manually and selectively supply a recording paper into the paper transfer path 35a.

The U/I (user interface) 36 allows the user to select desired functions and to instruct the conditions to execute the functions. The U/I 36 is provided with a color display 51 and a hard control panel 52. Additional use of an infrared touch board 53 enables the user to directly enter instructions with soft buttons on the screen.

The electric-control-board container 33 contains a plurality of control boards for the IIT 32, IOT 34, U/I 36, image processing system, film projector 64, and the like, an MCB board (machine control board) for controlling the operations of the IOT 34, ADF 62, sorter 63, and the like, and an SYS board for controlling all those units.

As described above, in the invention, the frame erasure is processed by the enlargement/reduction circuit having the functions of enlargement, reduction, movement, and the like. Accordingly, the area to be erased can be flexibly changed to a desired area, so that the frame erasure process will never create the spaces, which otherwise would be caused by the frame erasure.

Figure 8A:
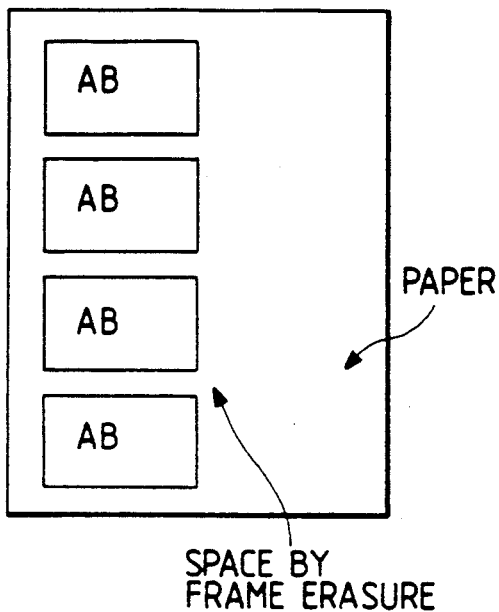
FIGS. 8A to 8D explanatory diagrams for explaining the harmful influence caused by the conventional frame-erasure processing.
Figure 8B:
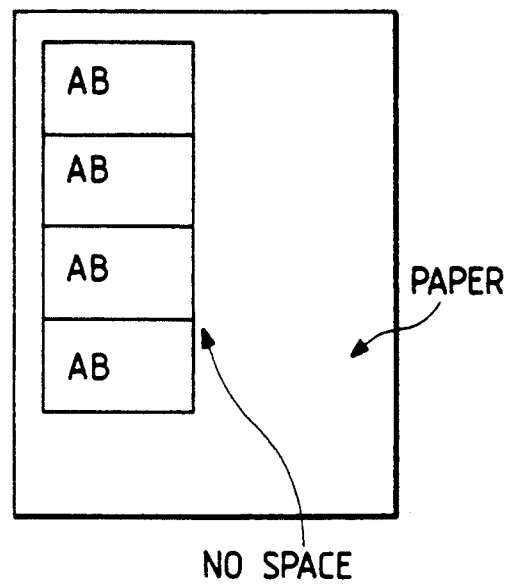
Figure 8C:
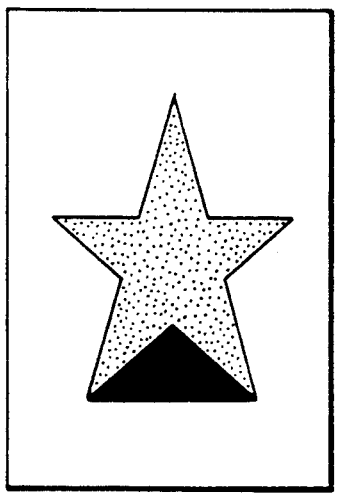
Figure 8D:
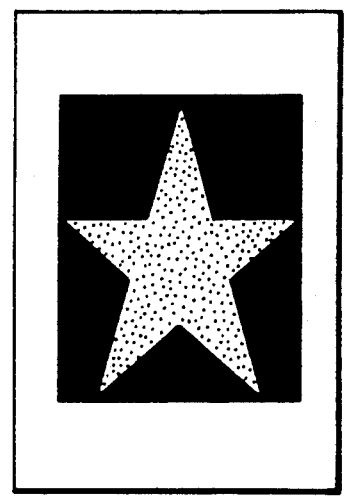

FIG. 6 shows explanatory diagrams comparatively showing some types of processings by the conventional technique and the invention in order to show the effects of the invention. With regard to the corner movement, when the conventional technique is used, after an image is moved to the corner, a space by the frame erasure is still present between the image and the corner, as shown in FIG. 6A. In this respect, the corner movement is imperfect. When the technique of the present invention is used, the perfect corner movement is realized with no space between the image and the corner in the image moved to the corner, as shown in FIG. 6B. With regard to the binding margin, when the conventional technique is used, the binding margin formed is always excessive as shown in FIG. 6C because the space by the frame erasure is essentially formed and is added to the binding margin. According to the technique of the invention, a user can form a binding margin of the size as designated, as shown in FIG. 6D. In the case of the multi-page enlargement, when the conventional technique is used, the resultant image is attendant with the space by the frame erasure, as shown in FIG. 6E. The image enlarged and repeated by the invention, as shown in FIG. 6D, is free from the space by the frame erasure. Also in the case of the repeat, when the conventional technique is used, the space by the frame erasure is created between the adjacent images, as shown in FIG. 8A. On the other hand, such a space is not present between the adjacent images, as shown in FIG. 8B. The frame erasure in the rectangle as shown in FIG. 8D is also possible.

What is claimed is:

1. An image processing apparatus comprising:

original read means for reading an image on an original document by a prescan and a copy scan;

image data processing means for converting original image signals from said original read means into digital image data signals, and for processing the digital image data signals;

output means for outputting processed image data signals;

original detecting means for reading coordinate data on the original document during said prescan; and enlargement/reduction processing means which stores image data read during said copy scan into a memory, and executes an enlargement/reduction processing in accordance with said image data stored in said memory, wherein said enlargement/reduction processing means carries out a frame-erasure process by using said coordinate data of the original document.

2. An image processing apparatus as claimed in claim 1, wherein said enlargement/reduction processing means comprises:

enlargement/reduction controlling means for controlling said enlargement/reduction processing means; and frame erasure processing means for erasing a peripheral portion of an original in accordance with frame erasure data supplied from said enlargement/reduction controlling means.

* * * * *